United States Patent
Tomono (10) Patent No.: US 6,943,788 B2
(45) Date of Patent: Sep. 13, 2005

(54) THREE-DIMENSIONAL IMAGE DISPLAY APPARATUS (75) Inventor: Takao Tomono, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 92 days.

(21) Appl. No.: 10/245,306

(22) Filed: Sep. 18, 2002

(65) Prior Publication Data
US 2003/0067460 A1 Apr. 10, 2003

(30) Foreign Application Priority Data
Oct. 10, 2001 (KR) .......................... 2001-62356

(51) Int. Cl.[7] .............................................. G06T 15/00
(52) U.S. Cl. ........................ 345/419; 348/42; 348/51
(58) Field of Search ............................ 345/419; 348/42, 348/51, 57, 58, 59

(56) References Cited

U.S. PATENT DOCUMENTS

| | | | | |
|---|---|---|---|---|
| 5,666,197 A | * | 9/1997 | Guerra | 356/512 |
| 5,910,940 A | * | 6/1999 | Guerra | 369/275.1 |
| 5,982,553 A | * | 11/1999 | Bloom et al. | 359/627 |
| 6,040,807 A | * | 3/2000 | Hamagishi et al. | 345/6 |
| 6,061,083 A | * | 5/2000 | Aritake et al. | 348/51 |
| 6,329,963 B1 | * | 12/2001 | Chiabrera et al. | 345/6 |
| 6,407,724 B2 | * | 6/2002 | Waldern et al. | 345/8 |
| 6,590,605 B1 | * | 7/2003 | Eichenlaub | 348/51 |

FOREIGN PATENT DOCUMENTS

| | | |
|---|---|---|
| JP | 2-42401 | 2/1990 |
| JP | 06-281804 | 10/1994 |
| JP | 09-043594 | 2/1997 |
| JP | 9-304738 | 11/1997 |
| JP | 2000-158458 | 6/2000 |

* cited by examiner

Primary Examiner—Phu K. Nguyen
(74) Attorney, Agent, or Firm—Sughrue Mion, PLLC

(57) ABSTRACT

A three-dimensional image display apparatus is provided. The three-dimensional image display apparatus, which includes an image forming display flat panel and a lens unit that is disposed in front of the image forming display flat panel and converts images projected from the image forming display flat panel into three-dimensional images. The lens unit includes a set of diffractive optical devices, each of which includes a plurality of diffractive grating elements that are parallel to one another and are disposed above the image forming display flat panel. Accordingly, the three-dimensional image display apparatus uses diffractive optical devices, each of which is composed of diffractive grating elements having very narrow widths, thereby displaying two- and three-dimensional images of good quality.

21 Claims, 7 Drawing Sheets

THREE-DIMENSIONAL IMAGE DISPLAY APPARATUS

BACKGROUND OF THE INVENTION

1. Field of the Invention

The present invention relates to a three-dimensional image display apparatus, and more particularly, to a multi-viewpoint three-dimensional image display apparatus with a diffractive optical device having a lenticular lens function. The present application is based on Korean Patent Application No. 2001-62356, filed Oct. 10, 2001, which is incorporated herein by reference.

2. Description of the Related Art

Three-dimensional image displays are largely classified into stereoscopic displays, multi-viewpoint displays, and volumetric displays.

A stereoscopic display uses binocular parallax. More specifically, a stereoscopic display shows two images to the respective left and right eyes so that the brain recognizes a three-dimensional image due to a binocular parallax. One approach for accomplishing a stereoscopic display is to create a three-dimensional image by wearing glasses, which is used in movie theatres and various events. For two images, viewers do not feel eye strain if there is no contradiction at vergence and the focal position. However, since the vergence and the focal position may be different due to different positions at which a viewer views images, the viewer feels eye strain when viewing stereoscopic images for a long period of time.

In a multi-viewpoint display, a plurality of images taken from different angles are displayed to allow a viewer to see a three-dimensional image. When a viewer moves, the image which the viewer is observing moves so that a plurality of viewers can observe the images. In addition, since different images taken from different angles are displayed, the contradiction of vergence and a focal position is less than in a stereoscopic display or may not occur at all. Accordingly, viewers feel less eye strain than when viewing a stereoscopic display.

In a volumetric display, a three-dimensional image can be recognized from an after-image in three dimensions. A volumetric display includes a method of rotating a display unit or screen and a method of reproducing beams of light using holograms, integral photography, or the like. In the volumetric display, the contradiction of vergence and a focal position does not occur, so viewers do not feel eye strain. However, complex optical mechanisms are required for the method of rotating a display unit or screen, and a panel having several hundreds or a thousand times higher resolution than usual panels is required for the method of reproducing beams of light.

A multi-viewpoint display includes lenticular methods and filter or slit methods.

Figure 1:
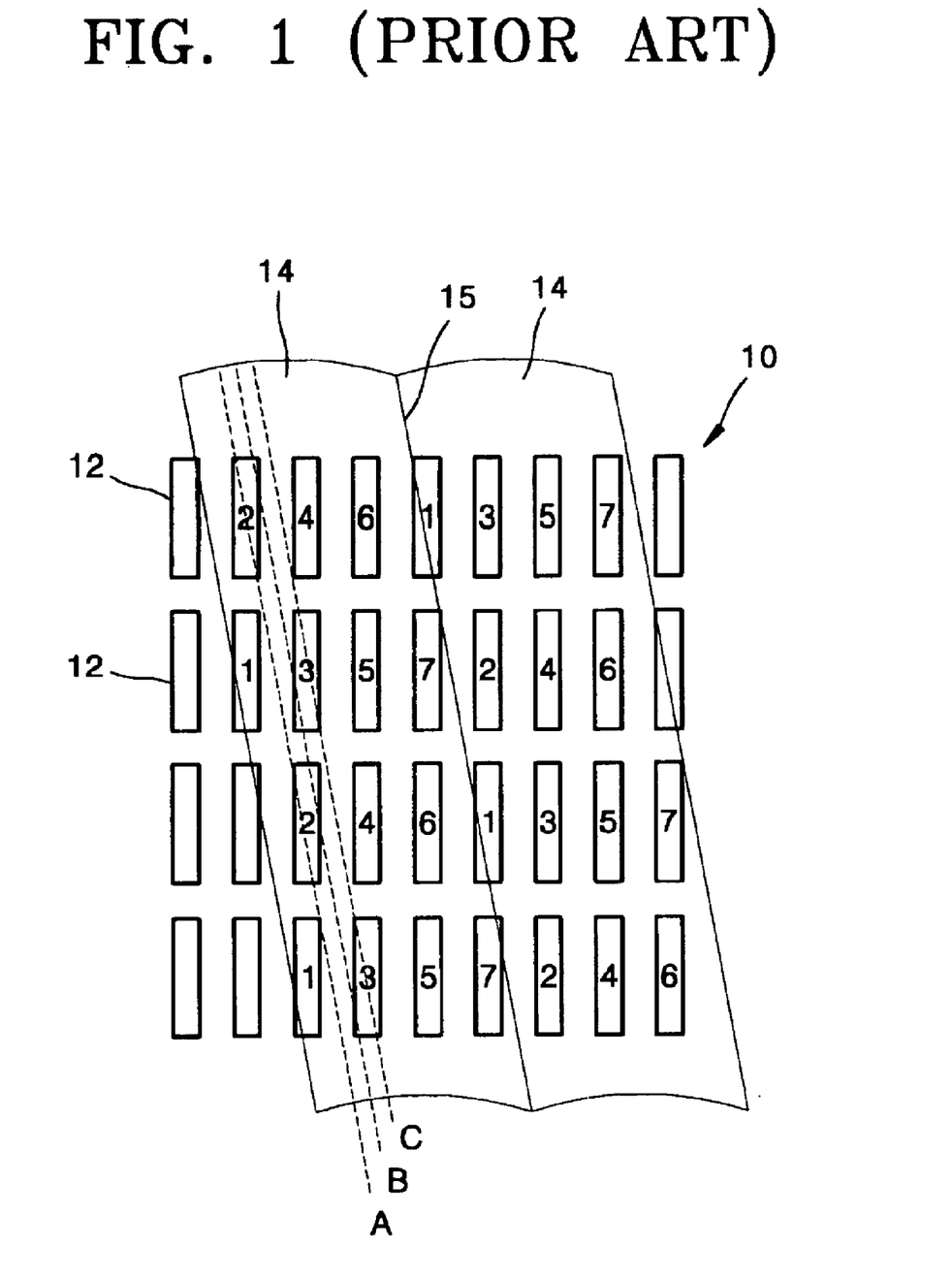
FIG. 1 is a diagram of a conventional three-dimensional image display apparatus using lenticular lenses.

FIG. 1 shows a lenticular method disclosed in International Patent Publication No. WO 99/5559. It shows a multi-viewpoint display using 7 viewpoints. Referring to FIG. 1, reference numeral 10 denotes a sub-pixel array on a panel, and reference numeral 12 denotes a sub-pixel. A number written within each of the sub-pixels 12 denotes the sequence of each of the 7 viewpoints. In case of color pixels, three consecutive sub-pixels having the same viewpoint number are red (R), green (G), and blue (B) sub-pixels and form a single color pixel. A slanted lenticular lens 14 is provided above the sub-pixel array 10. Sub-pixels 12 at a first row are arranged in order of 2, 4, 6, 1, 3, 5, and 7, and sub-pixels 12 at a second row are arranged in order of 1, 3, 5, 7, 2, 4, and 6. Two lenticular lenses 14 are provided above seven consecutive sub-pixels. When lines parallel to the slanted lenticular lenses 14 are drawn and processed from the left side to the right side of the panel, seven viewpoints can be sequentially viewed from sub-pixels 12 numbered 1 to sub-pixels 12 numbered 7. In other words, the sub-pixels 12 numbered 2 are connected along the dotted line A, the sub-pixels 12 numbered 2 and 3 are connected along the dotted line B, and the sub-pixels 12 numbered 3 are connected along the dotted line C.

However, in such a structure as shown in FIG. 1, there is a lenticular connection part 15 that crosses the sub-pixels 12. The sub-pixels, which are positioned at the lenticular connection part 15, are influenced by the two lenticular lenses 14 beside the lenticular connection part 15. Accordingly, a light beam is divided in two directions, so a dual image is shown when a three-dimensional image is displayed. Consequently, resolution is degraded. Moreover, when a two-dimensional image is displayed, the sub-pixels 12 at the lenticular connection part 15 do not serve to form an image, thus degrading resolution.

SUMMARY OF THE INVENTION

To solve the above-described problems, it is an object of the present invention to provide a three-dimensional multi-viewpoint image display apparatus, for improving the resolution of a three-dimensional image as well as the resolution of a two-dimensional image.

To achieve the above object of the present invention, there is provided a three-dimensional image display apparatus including an image forming display flat panel and a lens unit, which is disposed in front of the image forming display flat panel and converts images projected from the image forming display flat panel into three-dimensional images. The lens unit includes a set of diffractive optical devices, each of which comprises a plurality of diffractive grating elements that are parallel to one another and are disposed above the image forming display flat panel.

Preferably, the image forming display flat panel is a cathode-ray tube (CRT), a liquid crystal display (LCD), a plasma display panel (PDP), or an electroluminescent (EL) display.

Preferably, the maximum width of a diffractive grating element is no greater than a value "w" calculated from the following formula:

$$w \leq \frac{L \times \pi}{180 \times 40}$$

in which L indicates the distance (mm) between a display panel and a viewer.

The lens unit functions as a lenticular lens.

Preferably, each diffractive optical device is disposed on each corresponding pixel, which is composed of "n" sub-pixels, on the image forming display flat panel.

Each diffractive optical device and each pixel therebelow on the same row may be shifted by the pitch of at least one sub-pixel in a horizontal direction such that the diffractive optical devices and the pixels are disposed in a step pattern.

Each diffractive optical device has concentric steps having the same height, and the width of the steps decreases from the center toward the periphery at a predetermined ratio.

Preferably, the diffractive grating elements are formed to face the image forming display flat panel, and a coating sheet is disposed between the diffractive grating elements and the image forming display flat panel. Alternatively, the diffractive grating elements may be formed to face away from the image forming display flat panel, and a coating sheet is formed on the diffractive grating elements, such that it fills recesses among the diffractive grating elements.

Preferably, a refractive index of the diffractive optical devices is different from a refractive index of the coating sheet, and at least one among the diffractive optical device and the coating sheet is made of a carbonate-based polymer or a methacrylate-based polymer.

Preferably, the diffractive optical device is manufactured using a mold.

BRIEF DESCRIPTION OF THE DRAWINGS

The above object and advantages of the present invention will become more apparent by describing in detail preferred embodiments thereof with reference to the attached drawings, in which.

DETAILED DESCRIPTION OF THE INVENTION

Hereinafter, preferred embodiments of a three-dimensional image display apparatus according to the present invention will be described in detail with reference to the attached drawings. In the drawings, the thickness of layers and regions are exaggerated for clarity.

Figure 2:
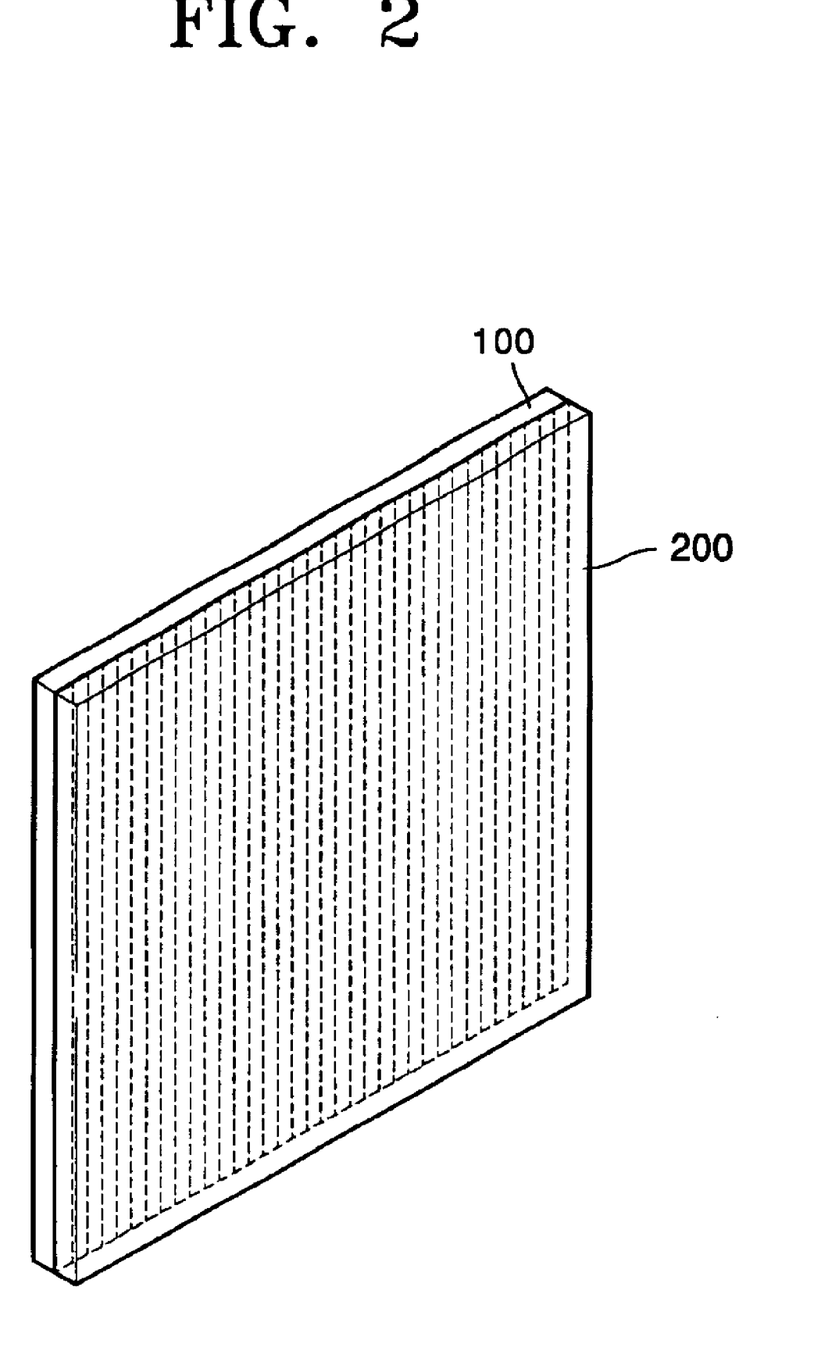
FIG. 2 is a perspective view of a three-dimensional image display apparatus according to the present invention.

FIG. 2 is a perspective view of a three-dimensional image display apparatus according to the present invention. Referring to FIG. 2, the three-dimensional image display apparatus includes an image forming display flat panel 100 and a lens unit 200 which is positioned in front of the image forming display flat panel 100 and converts an image, which is projected from the image forming display flat panel 100, into a three-dimensional image.

One among a cathode-ray tube (CRT), a liquid crystal display (LCD), a plasma display panel (PDP), and an electroluminescent (EL) display is used for the image forming display flat panel 100.

Figure 3:
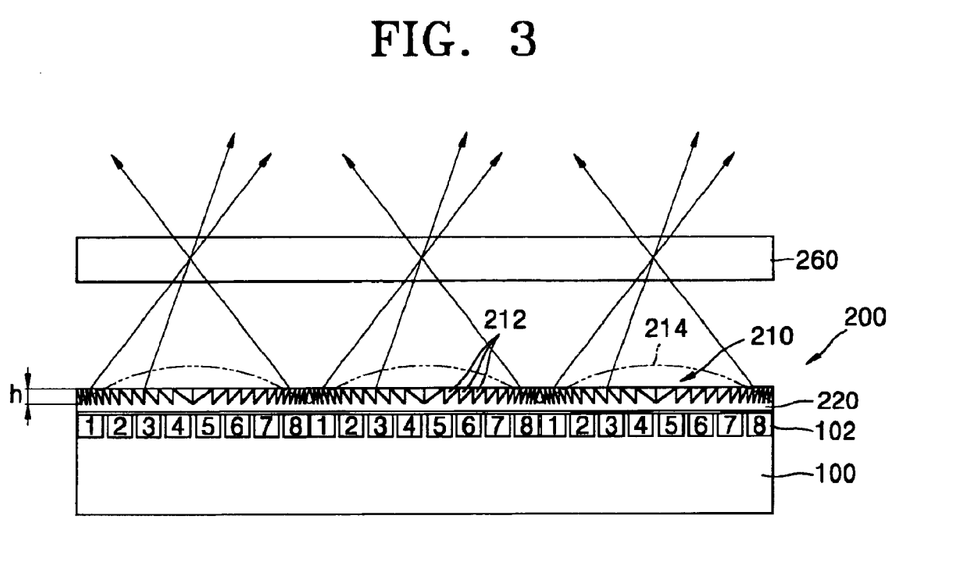
FIG. 3 is a diagram of an 8-viewpoint three-dimensional image display apparatus using a diffractive optical device according to the present invention.
Figure 4:
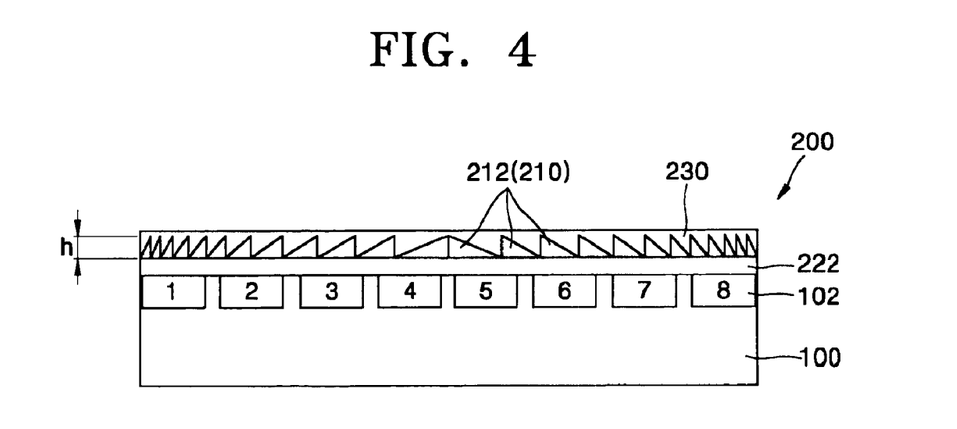
FIG. 4 is a diagram of another 8-viewpoint three-dimensional image display apparatus in which a diffractive optical device is disposed in a different manner than that shown in FIG. 3.

FIG. 3 is a diagram of an 8-viewpoint three-dimensional image display apparatus using an optical diffraction device, and FIG. 4 is a diagram of another 8-viewpoint three-dimensional image display apparatus, in which an optical diffraction device is disposed in a different manner than that shown in FIG. 3.

Referring to FIG. 3, a lens unit 200 is disposed on the image forming display flat panel 100. The lens unit 200 includes a plurality of diffractive optical devices 210, each of which is composed of a plurality of diffractive grating elements 212, in an area corresponding to a single lenticular 214 denoted by a dotted line. Eight sub-pixels 102 corresponding to each of the diffraction devices 210 are formed on the image forming display flat panel 100 in order to provide 8 viewpoints.

The diffractive grating elements 212 of each diffractive optical device 210 face the image forming display flat panel 100. Each diffractive optical device 210 has concentric steps having the same height "h". The width "w" (shown in FIG. 5) of each step decreases from the center of each diffractive optical device 210 toward the periphery at a predetermined ratio.

A coating sheet 220, which serves as a substrate with respect to the diffractive optical devices 210 and protects the surfaces of the diffractive grating elements 212, is disposed between the diffractive optical devices 210 and the image forming display flat panel 100.

The light beam from a first sub-pixel is diffracted toward the right most side of each diffractive optical device 210 in FIG. 3, and the light beam from an eighth sub-pixel is diffracted toward the left most side, so that a three-dimensional image 260 is formed where the diffracted light beams meet. Accordingly, each diffractive optical device 210 functions as a lenticular lens. When a viewer's eyes are located within a diffraction area, the eyes see two adjacent viewpoints so that the viewer can recognize a three-dimensional image. If the viewer moves within the diffraction area, the eyes see other two adjacent viewpoints, so the viewer can continuously recognize a three-dimensional image.

Referring to FIG. 4, a lens unit 200 is disposed on the image forming display flat panel 100. The lens unit 200 includes a substrate 222 disposed on the image forming display flat panel 100, a diffractive optical device 210 formed on the substrate 222, and a coating sheet 230 formed on the diffractive optical device 210. The diffractive grating elements 212 of the diffractive optical device 210 face away from the image forming display flat panel 100.

The coating sheet 230 is formed to be higher than the height "h" of the diffractive grating elements 212 in order to protect the diffractive grating elements 212 of the diffractive optical device 210 from dust or oil.

Referring to FIGS. 3 and 4, the refractive index of each diffractive optical device 210 is different from that of the coating sheets 220 and 230. Accordingly, the diffractive optical devices 210 diffract light. In addition, the refractive index of each diffractive optical device 210 must be greater than that of the coating sheets 220 and 230. In a structure like this, the lens unit 200 is advantageous in fine-tuning the refractive index of the diffractive optical devices 210.

The coating sheets 220 and 230 protect the diffractive grating elements 212 and can be manufactured by a mechanical process or by plastic injection molding.

For the diffractive optical device 210, variables, such as the widths of the individual diffractive grating elements 212, are calculated using computer simulation, and a mold is manufactured. Then, the manufactured mold is pressed into a thick plastic sheet to manufacture each diffractive optical device 210.

The substrate 222, the coating sheets 220 and 230, and the diffractive optical devices 210 are preferably made of polycarbonate-based plastic or polymethacrylate-based plastic.

Figure 5:
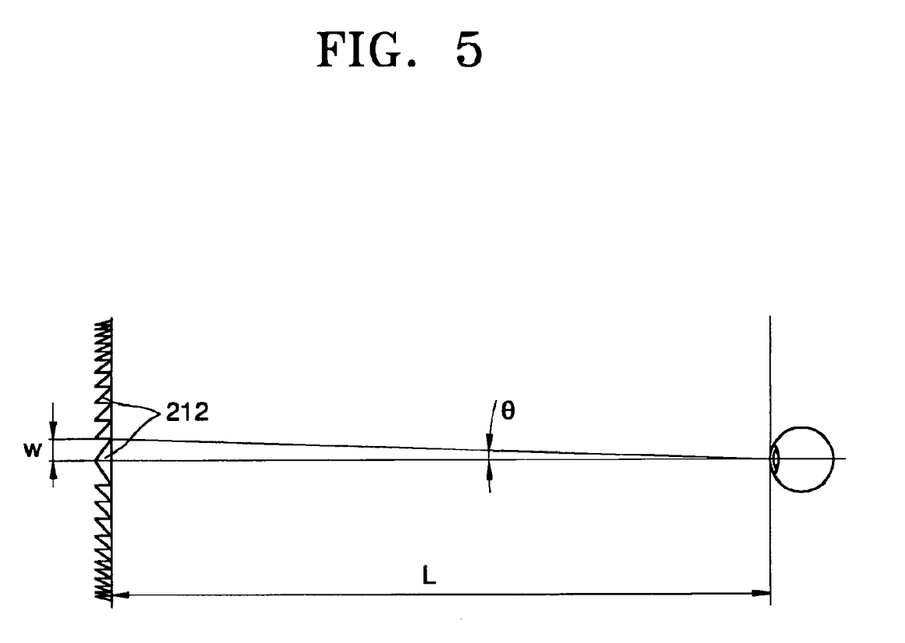
FIG. 5 is a diagram showing the width of a maximum diffractive grating element according to the present invention.

FIG. 5 is a diagram showing the width of each diffractive grating element 212 included in each diffractive optical device according to the present invention. Each diffractive optical device is composed of a plurality of diffractive grating elements 212. A spatial frequency that can be resolved by human eyes is about 40 cycles/degree. Accordingly, in order to avoid eye strain, it is preferable that the width "w" of a diffractive grating element 212, which is located at the center of each diffractive optical device and has a maximum size, satisfies the following formula.

$$w \leq \frac{L \times \pi}{180 \times 40}$$

Here, L indicates the distance (mm) between a display panel and a viewer.

When the above formula is satisfied, people cannot perceive diffractive grating elements with their eyes so that they do not feel eye strain when viewing images displayed on the panel.

Figure 6:
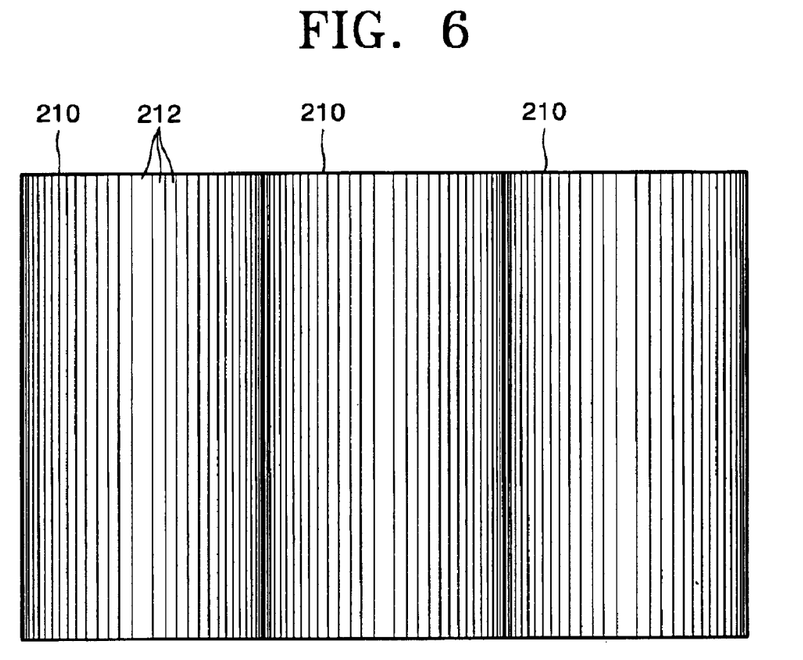
FIG. 6 is a plane view of a diffractive optical device according to a first embodiment of the present invention.
Figure 7:
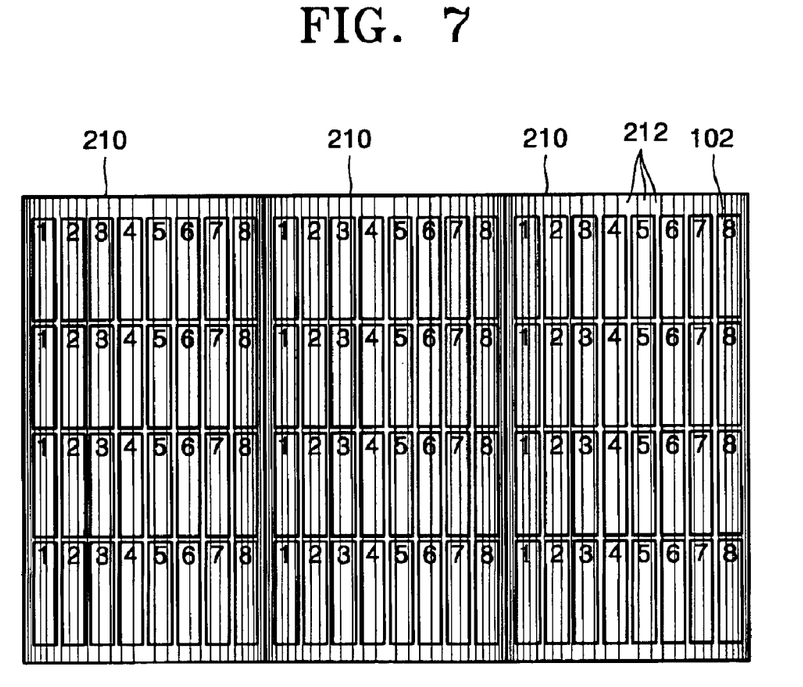
FIG. 7 is a plane view of a state in which the diffractive optical device shown in FIG. 6 is disposed on an array of image forming sub-pixels according to the first embodiment of the present invention.

FIG. 6 is a plane view of a diffractive optical device according to a first embodiment of the present invention. FIG. 7 is a plane view of a state in which the diffractive optical device shown in FIG. 6 is disposed on an array of image forming sub-pixels according to the first embodiment of the present invention.

Referring to FIGS. 6 and 7, a plurality of diffractive grating elements 212 are arranged in a vertical direction parallel to one another, thereby forming each diffractive optical device 210. In each diffractive optical device 210, the width of each diffractive grating element 212 is narrowed from the center toward the periphery. A plurality of pixels, each of which is composed of 8 sub-pixels 102, are arranged in vertical and horizontal directions. Each diffractive optical device 210 is disposed on the pixels arranged on a single column in the array of the plurality of pixels.

In an image display apparatus having such a structure, 8 sub-pixels in each pixel are arranged horizontally so that 8 viewpoints can be shown.

A three-dimensional image display apparatus having such a structure allows viewers to perceive a three-dimensional image at a focal position in each viewpoint, as shown in FIG. 3.

Figure 8:
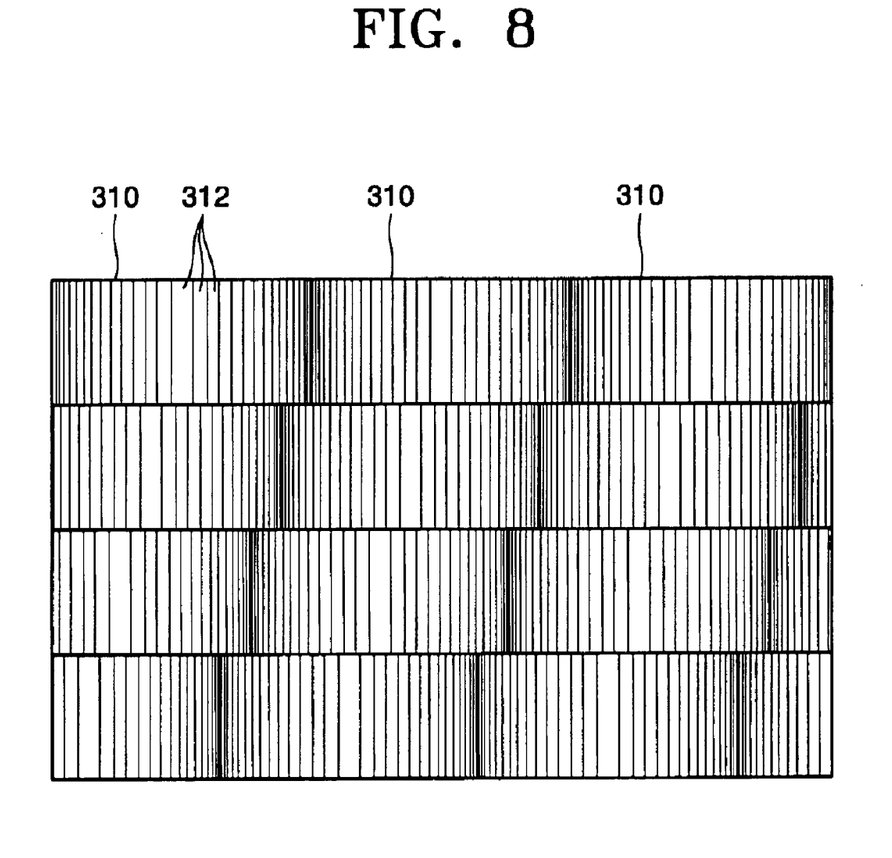
FIG. 8 is a plane view of a diffractive optical device according to a second embodiment of the present invention.
Figure 9:
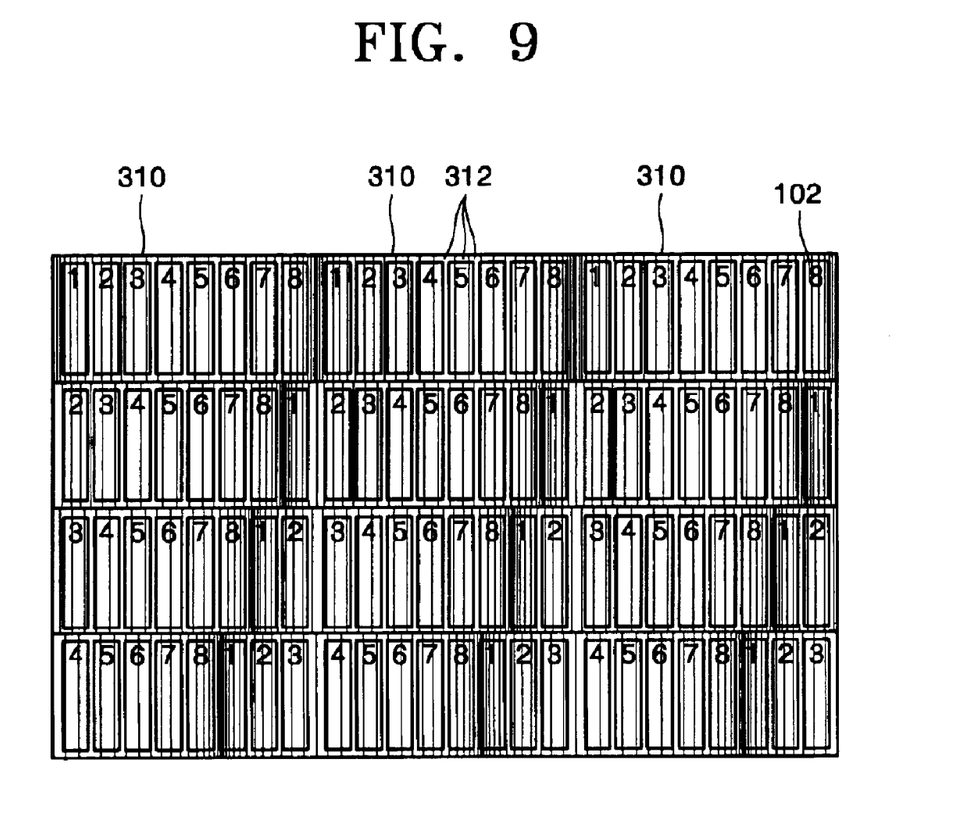
FIG. 9 is a plane view of a state in which the diffractive optical device shown in FIG. 8 is disposed on an array of image forming sub-pixels according to the second embodiment of the present invention.

FIG. 8 is a plane view of a diffractive optical device according to a second embodiment of the present invention. FIG. 9 is a plane view of a state in which the diffractive optical device shown in FIG. 8 is disposed on an array of image forming sub-pixels according to the second embodiment of the present invention.

Referring to FIGS. 8 and 9, each pixel composed of 8 sub-pixels 102 on one row is shifted to the left by the pitch of one sub-pixel 102 in the previous row. A single diffractive optical device 310 is disposed to correspond to each pixel which is composed of 8 sub-pixels 102. Accordingly, each diffractive optical device 310 is composed of a plurality of diffractive grating elements 312 and is shifted to the left by the pitch of one sub-pixel 102 in the same manner as each pixel is shifted as described above.

An image display apparatus having a structure as described above shows 8 viewpoints and also prevents a moire phenomenon, which may occur between two adjacent diffractive grating elements crossing a single sub-pixel, thereby improving the resolution of three-dimensional images as well as two-dimensional images.

A diffractive optical device according to the second embodiment is more complicated than that according to the first embodiment. Accordingly, it takes a longer period of time to manufacture a mold for the second embodiment than for the first embodiment. However, there is no difference in time required for pressing the manufactured mold into a plastic sheet.

As described above, a three-dimensional image display apparatus according to the present invention uses diffractive optical devices, each of which is composed of diffractive grating elements having very narrow widths, thereby displaying two- and three-dimensional images of good quality.

While this invention has been particularly shown and described with reference to preferred embodiments thereof, the preferred embodiments are used in descriptive senses only. It will be understood by those skilled in the art that various changes in form and details may be made therein. Therefore, the scope of the invention will be defined by the appended claims.

What is claimed is:

1. A three-dimensional image display apparatus comprising an image forming display flat panel and a lens unit, which is disposed in front of the image forming display flat panel and converts images projected from the image forming display flat panel into three-dimensional images, wherein the lens unit comprises a set of diffractive optical devices, all of which are in the same plane and each of which comprises a plurality of diffractive grating elements that are parallel to one another and are disposed above the image forming display flat panel, wherein a width of each adjacent diffractive grating element is smaller than a width of the adjacent grating element that is closer to the center of the diffractive optical device.

2. The three-dimensional image display apparatus of claim 1, wherein the image forming display flat panel is one selected from the group consisting of a cathode-ray tube (CRT), a liquid crystal display (LCD), a plasma display panel (PDP), and an electroluminescent (EL) display.

3. The three-dimensional image display apparatus of claim 1, wherein the maximum width of a diffractive grating element is no greater than a value "w" calculated from the following formula:

$$w \leq \frac{L \times \pi}{180 \times 40}$$

in which L indicates the distance (mm) between a display panel and a viewer.

4. The three-dimensional image display apparatus of claim 1, wherein the lens unit functions as a lenticular lens.

5. The three-dimensional image display apparatus of claim 1, wherein each diffractive optical device is disposed on each corresponding pixel, which is composed of "n" sub-pixels, on the image forming display flat panel.

6. The three-dimensional image display apparatus of claim 5, wherein each diffractive optical device and each pixel therebelow on the same row are shifted by the pitch of at least one sub-pixel in a horizontal direction such that the diffractive optical devices and the pixels are disposed in a step pattern.

7. The three-dimensional image display apparatus of claim 1, wherein each diffractive optical device has concentric steps having the same height, and the width of the steps decreases from the center toward the periphery at a predetermined ratio.

8. The three-dimensional image display apparatus of claim 1, wherein the diffractive grating elements are formed to face the image forming display flat panel, and a coating sheet is disposed between the diffractive grating elements and the image forming display flat panel.

9. The three-dimensional image display apparatus of claim 8, wherein a refractive index of the diffractive optical devices is different from a refractive index of the coating sheet.

10. The three-dimensional image display apparatus of claim 8, wherein at least one among the diffractive optical device and the coating sheet is made of a carbonate-based polymer or a methacrylate-based polymer.

11. The three-dimensional image display apparatus of claim 1, wherein the diffractive grating elements are formed to face away from the image forming display flat panel, and a coating sheet is formed on the diffractive grating elements, such that it fills recesses among the diffractive grating elements.

12. The three-dimensional image display apparatus of claim 11, wherein a refractive index of the diffractive grating elements is different from a refractive index of the coating sheet.

13. The three-dimensional image display apparatus of claim 11, wherein at least one among the diffractive optical device and the coating sheet is made of a carbonate-based polymer or a methacrylate-based polymer.

14. The three-dimensional image display apparatus of claim 1, wherein each of the diffractive optical devices is manufactured using a mold.

15. A three-dimensional image display apparatus comprising:
    an image forming display flat panel; and
    a lens unit disposed in front of the image forming display flat panel, wherein the lens unit converts images projected from the image forming display flat panel into three-dimensional images and comprises a plurality of identical adjacent diffractive optical devices, each diffractive optical device comprising a plurality of adjacent diffractive grating elements that are parallel to one another, wherein a width of each adjacent diffractive grating element is smaller than a width of the adjacent diffractive grating element that is closer to the center of the diffractive optical device.

16. A three-dimensional image display apparatus as claimed in claim 15, wherein a diffractive grating element located at a center of each respective diffractive optical device is wider than the other diffractive grating elements.

17. A three-dimensional image display apparatus as claimed in claim 15, wherein the height of each adjacent diffractive grating element is equal.

18. A three-dimensional image display apparatus as claimed in claim 15, wherein a slope of each adjacent diffractive grating element is larger than a slope of the adjacent diffractive grating element that is closer to the center of the diffractive optical device.

19. A three-dimensional image display apparatus as claimed in claim 15, wherein the maximum width of a diffractive grating element is no greater than a value "w" calculated from the following formula:

$$w \leq \frac{L \times \pi}{180 \times 40}$$

in which L indicates the distance (mm) between a display panel and a viewer.

20. A three-dimensional image display apparatus comprising an image forming display flat panel and a lens unit, which is disposed in front of the image forming display flat panel and converts images projected from the image forming display flat panel into three-dimensional images, wherein the lens unit comprises a set of diffractive optical devices, all of which are substantially the same size and in substantially the same plane and each of which comprises a plurality of diffractive grating elements that are parallel to one another and are disposed above the image forming display flat panel, wherein a width of each adjacent diffractive grating element is smaller than a width of the adjacent diffractive grating element that is closer to the center of the diffractive optical device.

21. A three-dimensional image display apparatus comprising:
    an image forming display flat panel; and
    a lens unit disposed in front of the image forming display flat panel, wherein the lens unit converts images projected from the image forming display flat panel into three-dimensional images and comprises a plurality of identical adjacent diffractive optical devices, each diffractive optical device comprising a plurality of adjacent diffractive grating elements that are parallel to one another, and wherein a diffractive grating element located at a center of each respective diffractive optical device is wider than the other diffractive grating elements and a width of each adjacent diffractive grating element is smaller than a width of the adjacent diffractive grating element that is closer to the center of the diffractive optical device and the height of each adjacent diffractive grating element is equal.

* * * * *